United States Patent
Krivohlavek

(10) Patent No.: US 10,920,038 B1
(45) Date of Patent: Feb. 16, 2021

(54) CROSSLINK AGENT DISPERSIBLE IN OIL OR WATER FOR POLYMER MODIFIED ASPHALT

(71) Applicant: Dennis D. Krivohlavek and Lucindy June Krivohlavek Revocable Family Trust, Catoosa, OK (US)

(72) Inventor: Dennis D. Krivohlavek, Catoosa, OK (US)

(73) Assignee: DENNIS D. KRIVOHLAVEK AND LUCINDY JUNE KRIVOHLAVEK REVOCABLE FAMILY, Catoosa, OK (US)

( * ) Notice: Subject to any disclaimer, the term of this patent is extended or adjusted under 35 U.S.C. 154(b) by 174 days.

(21) Appl. No.: 16/054,469

(22) Filed: Aug. 3, 2018

(51) Int. Cl.
- C08K 5/00 (2006.01)
- C08K 3/06 (2006.01)
- C10C 3/02 (2006.01)
- C08L 95/00 (2006.01)

(52) U.S. Cl.
CPC .............. C08K 5/0025 (2013.01); C08K 3/06 (2013.01); C08L 95/00 (2013.01); C10C 3/026 (2013.01)

(58) Field of Classification Search
None
See application file for complete search history.

(56) References Cited

U.S. PATENT DOCUMENTS

| | | | |
|---|---|---|---|
| 1,939,403 A | 12/1933 | Nagelvoort | |
| 2,028,482 A | 1/1936 | Tucker | |
| 3,461,080 A | 8/1969 | Eller et al. | |
| 3,960,585 A | 6/1976 | Gaw | |
| 4,155,654 A | 5/1979 | Kennepohl et al. | |
| 4,321,079 A | 3/1982 | Ott | |
| 5,407,477 A * | 4/1995 | Reynolds | C01B 33/44 106/284.2 |
| 5,646,224 A * | 7/1997 | Kawata | C08F 210/18 526/282 |
| 5,750,598 A * | 5/1998 | Krivohlavek | C08L 95/00 524/71 |
| 5,904,760 A | 5/1999 | Hayner | |
| 6,066,690 A * | 5/2000 | Shibata | C08K 9/00 428/1.27 |
| 6,133,351 A | 10/2000 | Hayner | |
| 6,451,886 B1 * | 9/2002 | Krivohlavek | C08L 95/00 524/59 |
| 6,569,351 B1 * | 5/2003 | Baumgardner | C08L 95/00 252/182.13 |

(Continued)

FOREIGN PATENT DOCUMENTS

| | | |
|---|---|---|
| CA | 2104908 | 2/1994 |
| CA | 2143716 | 9/1995 |

(Continued)

OTHER PUBLICATIONS

CN-104692334-A, Jun. 2015, Derwent AB. (Year: 2015).*

(Continued)

*Primary Examiner* — Satya B Sastri
(74) *Attorney, Agent, or Firm* — Head, Johnson, Kachigian & Wilkinson, PC

(57) ABSTRACT

Crosslink agents dispersible in oil or water for polymer modified asphalt. Sulfur is used in combination with hexamethylenetetramine and other adjuvants to form a powder compound suitable for use as is or dispersed in either oil or water.

10 Claims, 3 Drawing Sheets

Preferred Chemical Components of Preferred Crosslink Agent

| Chemical / Parts | 0.267 Parts in "O" | 0.143 Parts as "P" | 0.267 Parts in "W" |
|---|---|---|---|
| Sulfur, 200-mesh | 45.000 | 84.029 | 45.000 |
| Hexa | 4.000 | 7.469 | 4.000 |
| DE | 1.500 | 2.801 | 1.500 |
| Thermogel | 1.500 | 2.801 | 1.500 |
| Sunpar 110 | 1.500 | 2.801 | 1.500 |
| CuDD | 0.050 | 0.093 | 0.050 |
| DC200, 1000cSt visc | 0.003 | 0.006 | 0.003 |
| Liquid / Powder | 46.447 | N/A | 46.447 |

(56) References Cited

U.S. PATENT DOCUMENTS

| | | | |
|---|---|---|---|
| 6,706,787 | B1 | 3/2004 | Burris et al. |
| 6,737,469 | B2 | 5/2004 | Takamura et al. |
| 6,743,839 | B2 | 6/2004 | Colvin et al. |
| 6,927,245 | B2 | 8/2005 | Buras et al. |
| 7,357,594 | B2 | 4/2008 | Takamura |
| 8,025,724 | B2 | 9/2011 | Deme |
| 8,679,446 | B2 | 3/2014 | Iyer |
| 8,814,976 | B2 | 8/2014 | Pedersen |
| 9,643,336 | B1 | 5/2017 | Krivohlavek |
| 2005/0171251 | A1* | 8/2005 | Nakajima ............... C08L 95/00 524/59 |
| 2012/0128981 | A1 | 5/2012 | Iyer |
| 2013/0001466 | A1* | 1/2013 | Schroeder ............... C08J 3/248 252/182.17 |
| 2014/0193324 | A1 | 7/2014 | Iyer |
| 2018/0346725 | A1* | 12/2018 | Memon ................... C08K 3/06 |

FOREIGN PATENT DOCUMENTS

| | | | | |
|---|---|---|---|---|
| CN | 104692334 A | * | 6/2015 | |
| CN | 105885151 A | * | 8/2016 | |
| DE | 2053340 A1 | * | 5/1972 | .............. C08K 5/54 |
| EP | 0384254 | | 8/1990 | |
| EP | 2419390 | | 2/2012 | |

OTHER PUBLICATIONS

CN-105885151-A, , Aug. 2016, Machine translation (Year: 2016).*
DE-2053340-A1, May 1972, Machine translation (Year: 1972).*
Akron Dispersions; Water-Based Technology for Critical Applications.
Anderson, Mike, et al.; MSCR: A better tool for characterizing high temperature performance properties; Asphalt Magazine vol. 25, Issue 2; 2010.
Bencowitz, Isaac; Sulfur-Asphalt Dispersions; Ind. Eng. Chem., Sep. 1941, 33(9), pp. 1165-1168.
Department of Transportation; Extension and Replacement of Asphalt Cement with Sulfur; Mar. 1978 Final Report; FHWA-RD-78-95; Apr. 16, 1979.
Department of Transportation; the Multiple Stress Creep Recovery (MSCR) Procedure; FHWA-HIF-11-038; Apr. 2011.
Practical Guide to Latex Technology; Chapter 3 Latex Compounding Ingredients; pp. 27-39.
Shaw, Duncan J.; Introduction to Colloid and Surface Chemistry, 4th ed. Butterworth-Heinemann, Boston; 1992 ISBN 0 7506 1182 0. pp. 1-20.
Vanderbilt; Stabilizing Water-Based Dispersions No. 1236.

* cited by examiner

Preferred Chemical Components of Preferred Crosslink Agent

| Chemical / Parts | 0.267 Parts in "O" | 0.143 Parts as "P" | 0.267 Parts in "W" |
|---|---|---|---|
| Sulfur, 200-mesh | 45.000 | 84.029 | 45.000 |
| Hexa | 4.000 | 7.469 | 4.000 |
| DE | 1.500 | 2.801 | 1.500 |
| Thermogel | 1.500 | 2.801 | 1.500 |
| Sunpar 110 | 1.500 | 2.801 | 1.500 |
| CuDD | 0.050 | 0.093 | 0.050 |
| DC200, 1000cSt visc | 0.003 | 0.006 | 0.003 |
| Liquid / Powder | 46.447 | N/A | 46.447 |

FIG. 1

SBS Modified Asphalt with Preferred New Art Crosslink Agent

| Test, °C / X-Link | Asphalt Only | Asphalt +SBS | Sulfur "S" | Crosslink "O" | Crosslink "P" | Crosslink "W" |
|---|---|---|---|---|---|---|
| True Grade | 62.2-32.0 | 68.4-27.1 | 70.6-31.9 | 71.5-33.0 | 71.8-32.6 | 72.4-32.2 |
| Δ\|True Grade\| | 92.2 | 95.5 | 102.5 | 104.5 | 104.4 | 104.6 |
| Δ\|True Grade\| v "S" | -10.4 | -7.0 | 0.0 | +2.0 | +1.9 | +2.1 |
| Δ True DSR v "S" | -10.3 | -2.2 | 0.0 | +0.9 | +1.2 | +1.8 |
| Δ True m-value v "S" | +0.1 | +4.8 | 0.0 | -1.1 | -0.7 | -0.3 |
| Separation Test | N/A | 10.6 | 0.0 | +0.3 | -0.3 | +0.5 |
| J(nr) @ 3.2kPa, 58° | 2.51 | 0.86 | 0.29 | 0.27 | 0.28 | 0.25 |

FIG. 2

J(nr)@ 3.2kPa, 58°C Defining Traffic Values

| J(nr)@3.2kPa | Temperature, °C | Traffic Rating | ESAL's |
|---|---|---|---|
| ≤ 4.0 | 58 | S = Standard | < 10mm |
| ≤ 2.0 | 58 | H = Heavy | < 30mm |
| ≤ 1.0 | 58 | V = Very Heavy | > 30mm |
| ≤ 0.5 | 58 | E = Extremely Heavy | > 30mm + Standing Traffic |

FIG. 3

CROSSLINK AGENT DISPERSIBLE IN OIL OR WATER FOR POLYMER MODIFIED ASPHALT

BACKGROUND OF THE INVENTION

1. Field of the Invention

This invention is related to the use of crosslinking agents in the manufacture of modified and/or polymer modified asphalt or bituminous materials. The crosslink agent is a unique combination of materials suitable for introduction to the modified asphaltic or bituminous materials by being utilized in powder form or easily low shear mixed with either oil or water, or combinations thereof, at a manufacturing site on location. The unique combination of materials therein applied yields an improved modified product.

2. Description of the Related Art

There has long been a need within the asphalt industry to improve on the physical handling characteristics of cross-linking agents when modifying asphalt or bitumen for hot, warm or emulsification applications. Current art has centered around the use of dry powders shipped as is or pre-dispersed in a liquid to use on location in the powder form or pre-dispersed liquid. Liquids have typically been an oil. Non-limiting examples, such as process oils from petroleum or natural or synthetic oils, such as various refined or non-refined bean oils or phthalates, respectively. Water as a replacement to oils offers the opportunity for lower cost liquid. When water has been used in the asphalt industry, it is typically part of a water-based modifier and milled or co-milled into the emulsion during its formation. In this known technology, the crosslinking agent has typically been a part of the modifying material being formed into an asphalt emulsion. Water is not normally the liquid of choice when used as a carrier or dispersant medium for crosslink agents used to make modified asphalt or bitumen products.

By far, the most common crosslinking agent used in the asphalt or bitumen industry is elemental sulfur, due to its very low cost as compared to other crosslinking agents. But elemental sulfur does not lend itself to being easily handled or used in actual production settings. This is primarily due to sulfur's propensity to generate copious amounts of deadly, explosive and environmentally harmful hydrogen sulfide off gases before all the sulfur is added to the modified asphalt and during the post addition reaction part of the process. As a result, various methods of mechanically adding dry sulfur have been developed in efforts to minimize and keep the off gasses away from humans and out of the environment.

One of the most common alternates to direct dry or powder sulfur addition is pre-dispersing in a liquid, suitable to the application criterion, then adding it to the modified asphalt and followed optionally by asphalt emulsion formation. To this end, dry or powder sulfur is typically blended with selected liquids in special mixing equipment off site from the modified asphalt location, packaged in various size containers, and shipped to the manufacturing location for storage and use.

This overall method of making sulfur easier to handle at the modified asphalt or asphalt emulsion production site is wrought with unnecessary handling issues and expense. One non-limiting example of handling issues is that the liquid may not be necessary or may be a hindrance to the modified asphalt and, therefore, is an added hindrance to the crosslink and final product expense. Another handling issue is that, due to sulfur's density, such liquid dispersions are prone to quickly, typically in a matter of seconds or a few minutes, settle during storage, resulting in most always needing to be kept mixed during application to the modified asphalt. Such settling and mixing requirements create an inconsistent application and/or rate, resulting in inconsistent reactions and variations of the final modified asphalt or emulsion product. Further, a modified asphalt manufacturer now has the added expense of container disposal or return to the liquid blending location.

In the known art, there exists examples wherein are attempts to alleviate issues of sulfur settlement. One such example is disclosed in Buras et al. (U.S. Pat. No. 6,927,245), describing the use of dispersants known to be used in water applications that may be used in oil suspensions of sulfur, sulfur donors and the like for use in making polymer modified asphalt. Such dispersants are required to have the general chemical form of NP—P to perform effectively. Buras does not teach art related to NP—P chemicals being applied to water dispersions useful for crosslinking modified asphalt or emulsions. Further, related to the specific example of 2-ethylhexyl acid phosphate, said example may also pose health, environmental or storage issues. The present invention herein does not suffer from such issues.

Hayner (U.S. Pat. No. 6,133,351) taught the utility of dispersing sulfur in various hydrocarbon oils by use of expensive high shear blenders. Such high shear blenders (col 7, ln 56) may be available at the modified asphalt or emulsion plant (col 6, ln 29) for the purposes of making said dispersions or, alternately, such dispersions may be blended by third parties not at the plant. Not taught is the use of inexpensive low shear methods of making dispersions of sulfur independent of location.

Hayner (U.S. Pat. No. 5,904,760) illuminates that gellatants (col 9, ln 33) may be used in combination with high shear mixing, as indicted in col 7, ln 56. While Hayner anticipates mixing the crosslink formula on site at the modified asphalt location, it is also noted in col 6, ln 35, that such mixing may be accomplished by third parties. There is no mention of formations utilizing water as the alternate carrier for use in modified asphalt or asphalt emulsions.

Prior to art taught herein, such crosslinking agents, and particularly sulfur, could not suitably overcome the above deficiencies when used for purposes applied to modified asphalt.

SUMMARY OF THE INVENTION

The present invention is directed to a crosslink agent or agents for vulcanizing polymer modified asphalt or bitumen that can be used as a powder or easily dispersed into a hydrocarbon oil or water. The agent includes sulfur, hexamethylene tetramine, and at least one suspension agent or chemical effective in either oil or water. The crosslinking agent may be in powder form and include a dust suppressant therefor.

The crosslinking agent may include wetting or dispersing chemicals to aid powder dispersion in oils or water.

The crosslinking agent may include dust suppressant oils or liquid dispersion oils.

The crosslinking agent may include water for liquid dispersions. The crosslinking agent may include vulcanization co-reactants.

BRIEF DESCRIPTION OF THE DRAWINGS

FIG. 1 is a chart showing several examples of preferred embodiments of the present invention;

FIG. 2 is a chart showing examples of use of the present invention in tests; and FIG. 3 is a chart showing various separation values for different types of traffic.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The present invention may be utilized for making mixtures of aggregates, and/or recyclable materials or oils, and asphaltic or bituminous containing oil binders or emulsions thereof in various applications. Primarily, but not limited to, road applications may be applied to practice by the unexpected application of the preferred following embodiments.

In the preferred embodiment, sulfur is compounded by mixing with hexamethylene tetramine (a.k.a. "HEXA"), optional siliceous materials, such as the preferred zeolite diatomaceous earth (a.k.a. "DE," various sources), clay (preferred sepiolite clay Thermogel from IMV Nevada), a small amount of liquid hydrocarbon oil (Sunpar 110 from HollyFrontier, Tulsa) primarily for product dust abatement, a small amount of defoamer/wetting (DC200, 1000 cSt viscosity is preferred) chemical and, optionally, crosslink accelerant(s) of which is preferably the non-limiting example of copperdimethyldithiocarbamate (a.k.a. "CuDD") to make a preferred crosslink agent. This combination of chemicals, when compounded in the non-limiting examples shown herein, have been shown to exhibit unexpected utility as a crosslink agent in modified asphalt/bitumen. Not only did the above compound resist settlement in either oil or water liquid dispersions formed by low shear hand mixing, the present crosslink agent or compound also demonstrated unexpected improvements to the modified asphalt.

It has long been known that sulfur in all its various forms, elemental or sulfur donor or multiple variations thereof, now included herein by reference, can be used in vulcanizing unsaturated rubber and are included herein. This knowledge is well documented in both the rubber and asphalt or bitumen industry. It is also well documented in the asphalt industry that sulfur suffers from various handling characteristics and deficiencies in processing and product application.

Also, well-known and documented is the use of various forms and types of rubber. The common characteristic of rubber is the presence of the carbon-carbon double bond (i.e. "—C=C—") which is chemically available for vulcanization. The many and varied forms of such rubber suitable for vulcanization by the art taught herein include, but is not limited to, styrene-butadiene, isoprene, natural or ethylene-propylene-diene-monomer, butylene or, in general, any polymer containing the characteristic carbon-carbon double bond.

The following non-limiting examples and descriptions illustrate the practical utility of this new and unexpected art.

To teach the new and unexpected findings disclosed herein, a stock modified asphalt mixture of about 16,500 grams was made using SBS rubber (a block polymer rubber of styrene and butadiene) and a PG58-28 asphalt. Once made, the stock mixture was separated into 3,000 grams per round metal one-gallon container for experimental use. The non-limiting procedure for making the stock modified asphalt is outlined in accordance with the art taught in U.S. Pat. No. 9,643,336 by Krivohlavek. Any asphalt or SBS may be made by any suitable means to make the SBS homogeneous with the asphalt. The new art crosslinking agent disclosed herein is not dependent upon the method of forming the asphalt and SBS mixture.

A brief description of the procedure of U.S. Pat. No. 9,643,336, included herein by reference, used to make the stock asphalt SBS mixture and the one-gallon aliquots for use in illustrating the new art is given below as follows:

Stock Mixture Formula by Weight:
97.00%—16,000.15 grams PG58-28
3.00%—494.85 grams SBS=ChiMei Kibiton 5301 a typical linear triblock polymer Procedure:
Heat PG58-28 to 360°-365° F. under stirring U.S. Pat. No. 9,643,336
Add SBS and continue mixing at temperature until SBS is homogeneous
Discontinue mixing and pour 3,000 grams into round metal one-gallon containers One-Gallon Aliquot Formula Parts by Weight:
100.000 Parts—3000.000 grams Stock Mixture
0.120 Parts—Sulfur, or Equivalent from New Art Crosslink Compound Procedure:
Heat Aliquot of Stock Mixture to 360°-365° F. under stirring per U.S. Pat. No. 9,643,336
Add Slowly over, 5-minute period, 0.120 Parts Sulfur or Equivalent New Art Crosslink
Discontinue mixing after four hours, seal container
Store in heated oven (~330° F.) overnight for testing the next day.

Table 1 shows the composition of the preferred new art crosslink compound in dry powder (designated "P"), liquid oil (designated "O") and liquid water (designated "W") forms.

While there is no specific order by which to mix the dry ingredients of the preferred crosslink agent, it was found easier and faster to mix them to a homogeneous state in the order given by the procedure. A hand stir procedure was used for blending the powder pre-blended chemical components into the liquids to make the crosslink agent prior to introduction into the modified asphalt. No high shear equipment is necessary to achieve good powder dispersion, thereby saving great expense in manufacturing. The procedure for blending the chemical components of the crosslink agent in Table 1 is given as follows:

In a plastic 110-ml cup add:
HEXA+Thermogel and hand stir to homogeneous using spatula or plastic knife
Add CuDD and hand stir to homogeneous
Add HEXA and hand stir to homogeneous
Add sulfur and hand stir to homogeneous
Add Sunpar 110 pre-blended with DC200 and hand stir
Liquids, "O" and "W" are added and hand stirred to homogeneous Upon standing undisturbed, the "O" sample did not separate or show visible signs of settlement for several hours, while the "W" sample did not separate or show visible signs of settlement for several days. As is commonly known, the rate of separation or settlement is dependent upon concentration of the components and/or their ratio one to the other.

It is also common knowledge that water is normally considered constant in its viscosity for practical applications. Common knowledge also dictates that oils may have varying viscosities based upon their chemical composition and temperature. For this reason, the oil or "O" used to form the crosslink agent of FIG. 1 was the same oil as used for dust abatement, Sunpar 110. In consideration of the above, the ratios given in FIG. 1 are non-limiting and the ratios of the components may be adjusted to the desired concentrations for optimum performance.

FIG. 1 is a chart showing several examples of the crosslink agent.

The above preferred new art crosslink agents were then used to crosslink individual one-gallon aliquots of the stock SBS modified asphalt described above. The results of these forms of delivering sulfur to the modified asphalt are given in FIG. 2.

Tests descriptions in FIG. 2 are defined and use the Asphalt Only column to illustrate by example each test definition as follows:

Definition, Protocol and test procedure per AASHTO T 315 test method was followed to generate the Dynamic Shear Rheometer (a.k.a. "DSR"), m-values. The "J(nr)" values were generated per the AASHTO TP70 test method and defined therein.

"True Grade" is the calculated passing temperatures for the asphalt. By example, the asphalt has a "true" passing high temperature of 62.2° C. and a "true" minimum low temperature of −32.0° C., respectfully. Temperatures outside these respective points render the asphalt not suitable for service.

"Δ |True Grade|" is the sum of the absolute values of the True Grade. The asphalts two passing temperatures are therefore 62.2 plus 32.0 to equal 92.2° C. "Δ |True Grader|."

"Δ |True Grade| v "S"" is the difference between the "Δ |True Grade|" of the test sample from the "Δ |True Grade|" of sulfur. By example, the "Δ |True Grade|'s" for Asphalt Only and sulfur are 92.2° C. and 102.5° C., respectfully, to yield a −10.4° C. difference between them.

"Δ True DSR v "S"" as discussed herein is defined as the difference between the "True Grade" maximum DSR temperatures of the test sample and sulfur, respectfully. Again, by example, the "Δ True DSR v "S"" for asphalt and sulfur are 62.2 and 70.6, respectfully, for a "Δ True DSR v "S"" difference of −10.3° C.

Similarly, "Δ True m-value v "S"" as discussed herein is defined as the difference between the "True Grade" minimum m-value temperatures of the test sample and sulfur, respectfully. As before by example, the "Δ True m-value v "S"" for asphalt and sulfur are −32.0 and −31.9, respectfully, for a "Δ True m-value v "S"" difference of +0.1° C.

The Separation Test is by the Ring and Ball Method, as outlined in Test Method ASTM 5976.

"J(nr)@3.2 kPa, 58°" from AASHTO TP70 which is commonly known to be a part of the "MSCR" procedure. The acronym "MSCR" is defined as "Multiple Stress Creep Recovery." The "J(nr)@3.2 kPa, 58°" is the value sometimes commonly referred to as the "MSCR" value.

Discussions

An important reason for using a crosslink agent is to eliminate the separation of the modifier from the asphalt or bitumen. The Separation Test is employed to measure this separation phenomenon. An absolute value of less than 4° is considered acceptable. In FIG. 2, it is clear by the respective data that Asphalt+SBS is prone to separation with a +10.6° value. When any of the crosslink agents are added, be they the known art sulfur or variations of the new art taught herein, the Separation Test value is well below the absolute 4° acceptance value. Therefore, the new art crosslink agent would be considered acceptable for general application on an equal basis to sulfur.

It is generally accepted within the asphalt industry that the greater the absolute difference between the maximum DSR and minimum m-value temperature, the more effective or better the modified asphalt will be in actual field application. This is reflected in the "Δ |True Grade|" of the modified asphalt. Again, from FIG. 2 it is apparent that asphalt modified with SBS that is crosslinked is superior to modified SBS asphalt that is not crosslinked in that "Δ |True Grade|" for Asphalt+SBS has the lowest value at 95.5° C. versus all crosslinked values being 100° C. or greater. When comparing the crosslink "Δ |True Grade|" values, one of average skill in the art would expect all the crosslink samples to be very close to the same values, as they contain the same amount of sulfur. Surprisingly, this is not true. Unexpectedly, the new art crosslink agent, independent of form of delivery, oil ("O") or powder ("P") or ("W"), the "Δ |True Grade|" values are higher than sulfur at 104.5° C., 104.4° C., 104.6° C. versus 102.5° C., respectfully. For ease of comparison, by the "Δ |True Grade| v "S"" it is now clear to one of average skill in the art that the new art crosslink agent as taught herein is +2.0° C., +1.9° C. and +2.1° C. higher for "O," "P" and "W," respectively, in the "Δ |True Grade|" than sulfur.

It is also unexpected and surprising to note that both the True DSR and m-values are expanded above and below that of sulfur. From FIG. 2, the "Δ True DSR v "S"" for "O," "P" and "W" are +0.0° C., +0.9, +1.2° C. and +1.8, respectively. Correspondingly, the "Δ True m-value v "S"" values for "O," "P" and "W," are lowered by −1.1° C., −0.7° C. and −0.3° C., respectively.

ESAL is the acronym for equivalent single axle load. ESAL is a concept developed from data collected at the American Association of State Highway Officials (AASHO) Road Test to establish a damage relationship for comparing the effects of axles carrying different loads. The reference axle load is an 18,000-lb. with dual tires. There exists a relationship between ESAL's and the J(nr)@3.2 kPa, 58° C. of an asphalt or modified asphalt per AASHTO TP70 test procedure. A paper discussing the benefits of J(nr) are discussed in the paper entitled "MSCR: A better tool for characterizing high temperature performance properties" by Dr. Mike Anderson, et. al., is available online at the Asphalt Institute and now included herein by reference. Further reference to the utility of using J(nr) values are described in the Technical Brief "THE MULTIPLE STRESS CREEP RECOVERY (MSCR) PROCEDURE" available from the U.S. Department of Transportation, Federal Highway Administration, Office of Pavement Technology, FHWA-HIF-11-038, April 2011 and now included herein by reference.

For common purposes of classification and from Table 1 of the above reference (FHWA-HIF-11-038) to the asphalt paving industry, these comparative values are summarized in FIG. 3.

In very short summary, the lower the J(nr)@3.2 kPa value at test temperature, the better able the modified asphalt will be at withstanding repeated heavy traffic. In comparison of the J(nr)@3.2 kPa values from FIG. 2 for sulfur versus the new art crosslink agent taught herein, sulfur is the highest value at 0.29. Surprisingly, the new art crosslink agent J(nr)@3.2 kPa values ("O"=0.27; "P"=0.28; "W"=0.25), independent of the introduction method into the modified asphalt, is consistently lower than sulfur and therefore an improvement to modified asphalt quality.

The new art taught herein by example is not limited to the examples illustrating said new art. More specifically, diatomaceous earth and/or sepiolite clay are not necessarily specific to this new art. Other chemical adjuvants, such as, but not limited to, carboxylic acids that are both oil and water soluble are also within the purview taught herein. By non-limiting example, citric, tartaric and fumaric acids are within the purview taught by this new art. Also, by non-limiting example, crosslink accelerant(s) or co-vulcanization reactants other than copperdimethyldithiocarbamate (a.k.a. "CuDD") are inclusive. Non-limiting examples of crosslink accelerant(s) or co-vulcanization reactants would be activators, aldehyde amines, dithiocarbamates, sulfenamides, thiazoles, thioureas, thiurams, metal oxides or other vulcanization co-reactants. Sulfur donors and other like or similar chemicals known to accelerate, retard or otherwise influence the reaction of sulfur during vulcanization are also herein anticipated and within the purview of the art taught herein. Benefits of such crosslink accelerant(s) or co-vulcanization reactants, as with hexamethylenetetramine, within the purview of the art taught herein, would be or can be faster and/or more controlled reaction rates and/or lowering or eliminating the amount of dangerous off gasses such as, but not limited to, hydrogen sulfide.

By the new art now taught herein, unexpected benefits to a modified asphalt or bitumen may be realized by the combination of sulfur with hexamethylenetetramine into a crosslinking agent heretofore not known for crosslinking modifiers in said asphalt or bitumen. The added unexpected advantage of easily dispersing this new crosslinking agent in either oils or water is also demonstrated and shown unexpected advantages not previously known to one of average skill in the art.

Whereas, the invention has been described in relation to the drawings attached hereto, it should be understood that other and further modifications, apart from those shown or suggested herein, may be made within the scope of this invention.

What is claimed is:

1. A crosslinking composition, for vulcanizing polymer modified asphalt or bitumen, that can be used as a powder or dispersed into either a hydrocarbon oil or water, which crosslinking composition consisting of:
    (a). elemental sulfur;
    (b). hexamethylenetetramine;
    (c). at least one suspension agent configured to promote suspension in both oil and water;
    (d). at least one wetting or dispersing chemical to aid dispersion in oils or water;
    (e). optionally dust suppressant oils; and
    (f). optionally at least one vulcanization co-reactant.

2. The crosslinking composition as set forth in claim 1 wherein the crosslinking composition is in powder form.

3. The crosslinking composition as set forth in claim 1 wherein the suspension agent is either siliceous, zeolite, clay or both zeolite and clay.

4. The crosslinking composition as set forth in claim 1 wherein the suspension agent is diatomaceous earth.

5. The crosslinking composition as set forth in claim 3 wherein the suspension agent is sepiolite clay.

6. The crosslinking composition as set forth in claim 1 wherein the at least one wetting or dispersing chemical is silicone fluid.

7. The crosslinking composition as set forth in claim 1 wherein the dust suppressant oils are refined, natural, or synthetic.

8. The crosslinking composition as set forth in claim 7 wherein the dust suppressant oils are paraffinic process oils.

9. The crosslinking composition as set forth in claim 1 wherein said at least one vulcanization co-reactant are selected from the group consisting of: activators, aldehyde amines, dithiocarbamates, sulfenamides, thiazoles, thioureas, thiurams, and metal oxides.

10. The crosslinking composition as set forth in claim 9 wherein the at least one vulcanization co-reactant is copperdimethyldithiocarbamate.

* * * * *